United States Patent
De Rivaz

(10) Patent No.: US 10,416,006 B2
(45) Date of Patent: Sep. 17, 2019

(54) METHOD OF IDENTIFYING POSITIONS OF OBJECTS IN AN ENVIRONMENT

(71) Applicant: COMMISSARIAT À L'ENERGIE ATOMIQUE ET AUX ENERGIES ALTERNATIVES, Paris (FR)

(72) Inventor: Sébastien De Rivaz, Villard-d'Héry (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 260 days.

(21) Appl. No.: 14/974,832

(22) Filed: Dec. 18, 2015

(65) Prior Publication Data

US 2016/0178408 A1    Jun. 23, 2016

(30) Foreign Application Priority Data

Dec. 19, 2014  (FR) ...................................... 1462981

(51) Int. Cl.
*G01D 5/48* (2006.01)
*G01S 5/02* (2010.01)

(52) U.S. Cl.
CPC .............. *G01D 5/48* (2013.01); *G01S 5/0252* (2013.01); *G01S 5/0278* (2013.01)

(58) Field of Classification Search
CPC ........... G06K 7/10366; G06K 7/10306; G06K 7/10227; G06K 7/10297; G06K 9/00342
See application file for complete search history.

(56) References Cited

U.S. PATENT DOCUMENTS

| | | | |
|---|---|---|---|
| 9,709,665 B2 * | 7/2017 | Takasago | ................ G01S 7/352 |
| 2007/0010956 A1 | 1/2007 | Nerguizian et al. | |
| 2013/0172020 A1 | 7/2013 | Aweya et al. | |

FOREIGN PATENT DOCUMENTS

EP          2138861 A1     12/2009

* cited by examiner

*Primary Examiner* — Tony Tran
(74) *Attorney, Agent, or Firm* — Oliff PLC

(57) ABSTRACT

This method includes the steps of a) providing a tool configured to cooperated with each object in a cooperation position, the tool being equipped with a transmitter of a signal of Ultra-Wide Band type, b) arranging at least one receiver configured to provide data ($X_1$, $X_2$, $X_3$, $X_4$) representative of the corresponding cooperation position, and forming a random variable, noted X, c) acquiring at least M times the data ($X_1$, $X_2$, $X_3$, $X_4$) for each of the cooperation positions, where M is a natural number greater than a predetermined value, d) calculating the expectation of X, noted E[X], e) arranging the tool (1) in a current position, f) acquiring at least one current piece of data, provided by the at least one receiver for the current position, g) applying an identification criterion including E[X] to identify the current position from among the K cooperation positions.

9 Claims, 3 Drawing Sheets

METHOD OF IDENTIFYING POSITIONS OF OBJECTS IN AN ENVIRONMENT

TECHNICAL FIELD

The present invention relates to a method of identifying positions of objects in an environment, in particular an industrial environment.

As non-limiting examples, the objects may be assembly points such as screws, rivets, welding spots.

In the context of the monitoring of an industrial process, it may be appropriate to verify that an assembly point has not been forgotten, or also that a current assembly point, that is, during an assembly operation, is consistent with the expected assembly point.

BACKGROUND ART

To achieve this, it is known from the state of the art, particularly from document EP 2138861 (hereafter, D1), to locate objects in the environment.

To achieve this, D1 provides a system for locating a set of objects, comprising:

a tool configured to cooperate with each object of the set in a so-called cooperation position, the tool being equipped with a transmitter of an Ultra Wide Band signal (UWB), a plurality of receivers of the signal arranged to receive the signal.

The transmitter and the plurality of receivers form ranging means enabling to locate the tool in a cooperation position, and thereby to locate the corresponding object.

"Ultra Wide Band" means a signal having:

an absolute bandwidth measured at −10 dB greater than 250 MHz, or even greater than 500 MHz if the United States definition of UWB is considered, or a relative bandwidth measured at −10 dB greater than 20% of the central frequency.

UWB-type signals are particularly suited to an industrial environment since such signals are little confronted to multipath issues.

The location system of D1 is not totally satisfactory since it requires a minimum number of receivers to use the ranging technique, called time difference of arrival, TDOA technique, see § 0042. This minimum number of receivers is 3, due to a triangulation calculation. Further, the accuracy of the location system of D1 may be strongly decreased by measurement biases introduced by the environment, see § 0045. This may result in an insufficient accuracy for certain applications.

SUMMARY OF THE INVENTION

The present invention aims at overcoming all or part of the above-mentioned disadvantages, and relates for this purpose to a method of identifying the position of a set of K objects in an environment, K being a natural number greater than or equal to 2, the method comprising the steps of:
a) providing a tool configured to cooperate with each object of the set in a so-called cooperation position, the tool being equipped with a transmitter of a signal of Ultra Wide Band type,
b) arranging at least one receiver in the environment to receive said signal for each of the K cooperation positions, the or each receiver being configured to deliver data representative of the corresponding cooperation position, said data forming a random variable, noted X,
c) acquiring at least M times the data delivered by the or each receiver for each of the K cooperation positions, where M is a natural number greater than a predetermined value,
d) calculating the expectation of X, noted E[X], for each of the K cooperation positions based on the M pieces of data acquired at step c),
e) arranging the tool in a cooperation position, called current position,
f) acquiring at least one piece of data, called current data, delivered by the or each receiver for the current position,
g) applying an identification criterion comprising E[X] based on the current data to identify the current position from among the K cooperation positions.

The present invention also relates to a method of identifying the position of a set of K objects in an environment, K being a natural number greater than or equal to 2, the method comprising the steps of:
a) providing a tool configured to cooperate with each object of the set in a so-called cooperation position, the tool being equipped with a receiver of a signal of Ultra Wide Band type,
b) arranging at least one transmitter in the environment to transmit said signal for each of the K cooperation positions, the receiver of the tool being configured to deliver data representative of the corresponding cooperation position, said data forming a random variable, noted X,
c) acquiring at least M times the data delivered by the receiver for each of the K cooperation positions, where M is a natural number greater than a predetermined value,
d) calculating the expectation of X, noted E[X], for each of the K cooperation positions based on the M pieces of data acquired at step c),
e) arranging the tool in a cooperation position, called current position,
f) acquiring at least one piece of data, called current data, delivered by the receiver for the current position,
g) applying an identification criterion comprising E[X] based on the current data to identify the current position from among the K cooperation positions.

The present invention finally relates to a method of identifying the position of a set of K objects in an environment, K being a natural number greater than or equal to 2, the method comprising the steps of:
a) providing a tool configured to cooperate with each object of the set in a so-called cooperation position, the tool being equipped with a transceiver of a signal of Ultra Wide Band type,
b) arranging at least one transceiver in the environment to transmit and receive said signal for each of the K cooperation positions, the transceiver of the tool and each transceiver of the environment being configured to deliver data representative of the corresponding cooperation position, said data forming a random variable, noted X,
c) acquiring at least M times the data delivered by the transceiver of the tool and each transceiver of the environment for each of the K cooperation positions, where M is a natural number greater than a predetermined value,
d) calculating the expectation of X, noted E[X], for each of the K cooperation positions based on the M pieces of data acquired at step c),
e) arranging the tool in a cooperation position, called current position,
f) acquiring at least one piece of data, called current data, provided by the transceiver of the tool and each transceiver of the environment for the current position, g) applying an identification criterion comprising E[X] based on the current data to identify the current position from among the K cooperation positions.

Thus, such methods according to the invention enable to do away with measurement biases introduced by the environment due to steps c) and d), which enable to define a signature characteristic of the K cooperation positions. The signature characteristic of the K cooperation positions is expressed by E[X]. This characteristic signature enables to identify the K cooperation positions without having to accurately locate them. Conversely to D1, such methods according to the invention thus do not require an accurate location by ranging of the K cooperation positions, so that a single receiver may be sufficient to identify the K cooperation positions. The common inventive concept between such methods according to the invention thus lies in steps c) and d) defining a characteristic signature of the K cooperation positions.

E[X] forms a base for quantifying the similarity between the current position and the K cooperation positions.

"Ultra Wide Band" (UWB) means a signal having:
an absolute bandwidth measured at −10 dB greater than 250 MHz, or even greater than 500 MHz if the United States definition of UWB is considered, or
a relative bandwidth measured at −10 dB greater than 20% of the central frequency.

The UWB-type signal is preferably a pulse signal.

Further, the value for M is preferably predetermined according to the environment background noise. Advantageously, M is in the range from 10 to 100.

According to an embodiment, the signal propagates in a propagation channel, and the data delivered at step b) comprise all or part of the pulse response of the corresponding propagation channel, X being vectorial.

Thus, the intrinsic information contained in all or part of the pulse response is representative of the corresponding cooperation position. Such intrinsic information enables to distinguish two different cooperation positions and to gain accuracy relatively to a single distance value. The fact of only using a portion of the pulse response enables to decrease calculation times.

According to an embodiment, the pulse response has complex values, and the identification criterion applied at step g) is selected from the group comprising the scalar product, and the vectorial product between the current data and E[X].

Thus, such a scalar product and such a vectorial product enable to quantify the similarity between the current data and E[X].

According to an alternative embodiment, the pulse response has real values, and the identification criterion applied at step g) is the coefficient of intercorrelation between the current data and E[X].

Thus, such an intercorrelation coefficient enables to quantify the similarity between the current data and E[X].

According to an embodiment, the signal propagates in a propagation channel, and the data delivered at step b) comprise information representative of the distance between the tool in the corresponding cooperation position and the corresponding transmitter or receiver in the environment, said information being extracted from the pulse response of the corresponding propagation channel, X being scalar.

Thus, the information extracted from the pulse response is representative of the distance between the tool in the corresponding cooperation position and the corresponding transmitter or receiver in the environment, and thus representative of the corresponding cooperation position. This information is extrinsic information originating from the pulse response, which enables to distinguish two different cooperation positions. The extraction of the information comprises a step of analyzing the pulse response to provide a time of arrival of the UWB signal. Then, a propagation time of the UWB signal is calculated from the time of arrival. Finally, the distance is extracted from the propagation time.

According to an embodiment, step d) comprises a step d1) of calculating the standard deviation of X, noted $\sigma_X$, for each of the K cooperation positions based on the M pieces of data acquired at step c), and the identification criterion applied at step g) further comprises $\sigma_X$.

Thus, couple E[X] and $\sigma_X$ forms a signature characteristic of the K cooperation positions; E[X] forms a base for quantifying the similarity between the current position and the K cooperation positions, while $\sigma_X$ enables to quantify the reliability of the signature.

According to an embodiment, the identification criterion applied at step g) is the Mahalanobis distance between the current data and E[X].

Thus, the Mahalanobis distance enables to quantify the similarity between the current data and E[X].

According to an alternative embodiment, the identification criterion applied at step g) results from the least squares method or from the gradient method. Such methods enable to quantify the similarity between the current data and E[X].

According to an embodiment, step e) is executed by arranging the tool Q times in the K cooperation positions according to a predetermined order, where Q is a natural number greater than or equal to M, and steps c) and f) are simultaneous, the data acquired at step c) originating from the current data acquired at step f).

Now, the characteristic signature of the K cooperation positions, that is, at least E[X], may be obtained during steps e) and f), based on successive current positions. Simultaneous steps c) and f) allow a self-calibration of the measurements of the current data acquired at step f).

According to an alternative embodiment, step c) is executed by arranging the tool a single time successively in the K cooperation positions, and step c) is prior to step e).

Thus, the characteristic signature of the K cooperation positions, that is, at least E[X], is obtained before steps e) and f). Step c) prior to step e) allows a pre-calibration of the current data measurements acquired at step f).

According to an embodiment, step b) is executed with N fixed receivers in the environment, N being a natural number greater than or equal to 1.

Thus, a significant number N of fixed receivers enables to increase the reliability of the characteristic signature of the K positions.

According to an embodiment, step b) is executed with N fixed transceivers in the environment, N being a natural number greater than or equal to 2.

Thus, a significant number N of fixed transceivers enables to increase the reliability of the characteristic signature of the K positions.

According to an alternative embodiment, step b) is executed with a single receiver mobile in the environment between N predetermined positions according to the K cooperation positions, N being a natural number greater than or equal to 2.

Thus, a single receiver mobile between N predetermined positions according to the K cooperation positions enables to have an effect identical to N fixed receivers, N being a natural number greater than or equal to 2. A significant number N of predetermined positions enables to increase the reliability of the characteristic signature of the K positions. The fact of using a single mobile receiver with a significant number N of predetermined positions thus enables to increase the reliability of the characteristic signature of the K positions while doing away with hardware costs linked to N fixed receivers.

According to an alternative embodiment, step b) is executed with a single transceiver mobile in the environment between N predetermined positions according to the K cooperation positions, N being a natural number greater than or equal to 2.

Thus, a single transceiver mobile between N predetermined positions according to the K cooperation positions enables to have an effect identical to N fixed transceivers, N being a natural number greater than or equal to 2. A significant number N of predetermined positions enables to increase the reliability of the characteristic signature of the K positions. The fact of using a single mobile transceiver with a significant number N of predetermined positions thus enables to increase the reliability of the characteristic signature of the K positions while doing away with hardware costs linked to N fixed transceivers.

Advantageously, step f) is executed by acquiring M' times the current data, where M' is a natural number, preferably strictly smaller than M.

Thus, the fact of acquiring M' times the current data enables to improve the measurement quality while decreasing the influence of the background noise of the environment for the identification.

According to an embodiment, the current data form a random variable, noted X', step f) comprises a step of calculating the expectation of X', noted E[X'], based on the M' acquired pieces of current data, and the identification criterion is applied from E[X'] at step g).

According to an alternative embodiment, the identification criterion is applied from each of the M' current data at step g), and the current position is identified as the cooperation position mainly identified after step g).

According to an embodiment, the K objects are fixed in the environment.

Thus, the tool may be non-reproducibly arranged in cooperation positions, for example, via an operator.

According to an embodiment, step c) is executed by reproducibly arranging the tool in the K cooperation positions.

It is thus possible to implement the method including when the K objects are mobile in the environment. Step c) may be executed with an automaton.

BRIEF DESCRIPTION OF THE DRAWINGS

The foregoing and other features and advantages will be discussed in detail in the following non-limiting description of different embodiments of a method according to the invention, in connection with the accompanying drawings, among which.

For the different embodiments, the same references will be used for identical elements or elements performing the same function, to simplify the description.

DETAILED DESCRIPTION OF THE EMBODIMENTS

Figure 1:
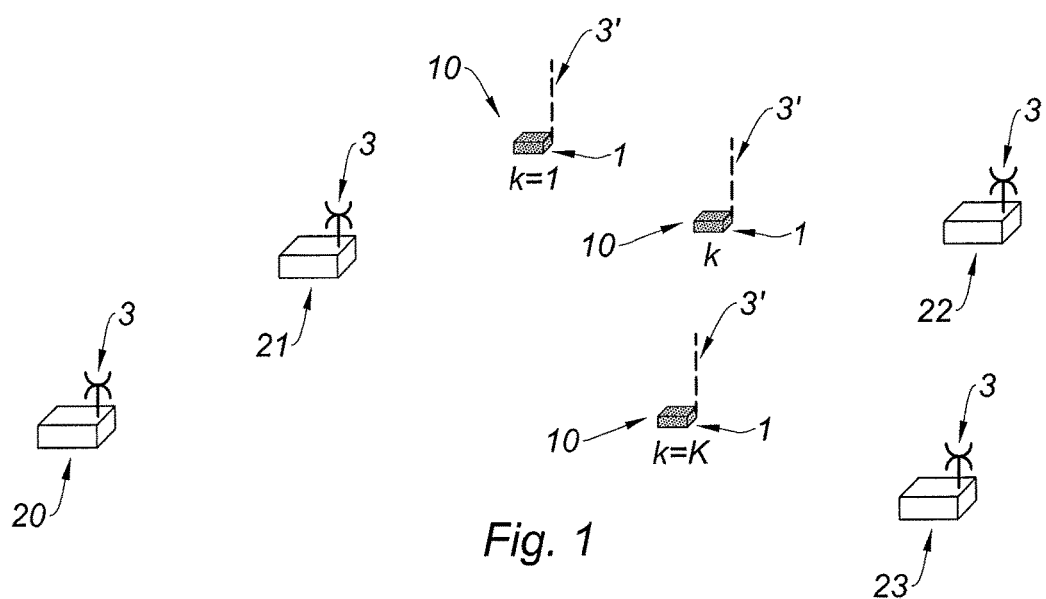
FIG. 1 is a simplified view of a tool successively arranged in 3 cooperation positions with the presence of 4 fixed receivers according to a first method according to the invention.
Figure 2:
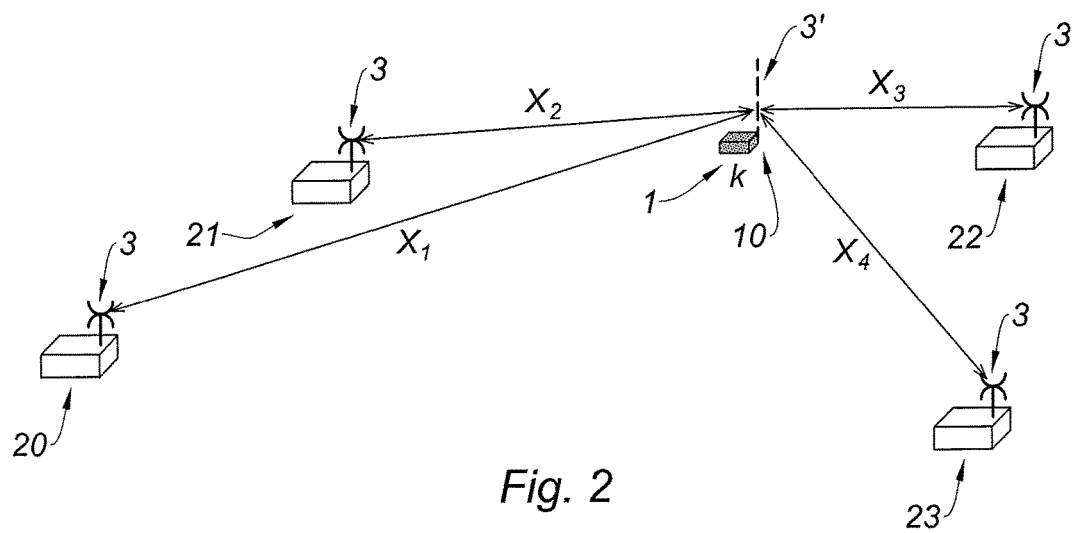
FIG. 2 is a simplified view of the tool of FIG. 1 in a k-th given cooperation position, and illustrating the reception by the 4 fixed receivers of the UWB-type signal sent by the tool.
Figure 3:
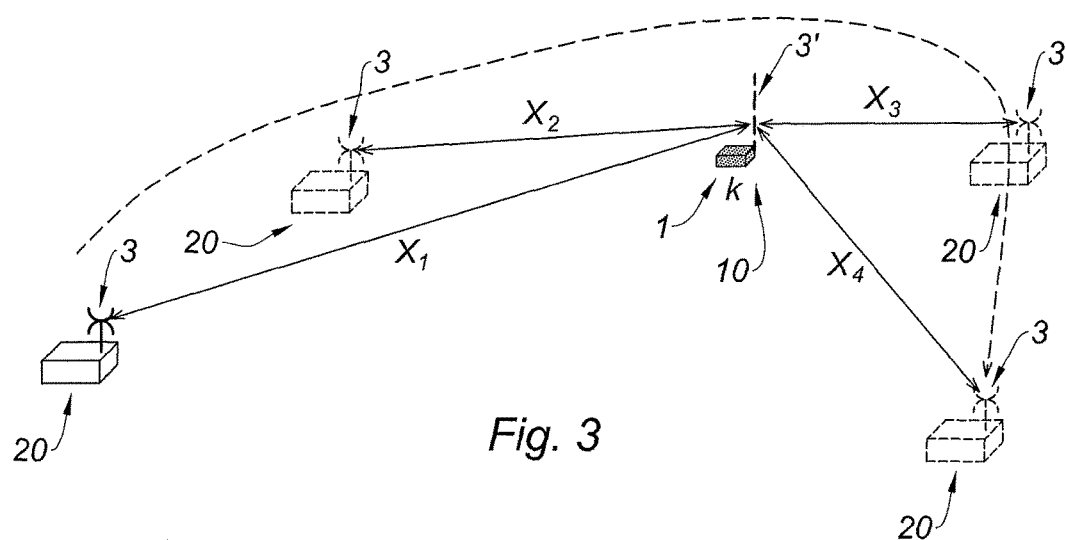
FIG. 3 is a simplified view of a tool in a k-th given cooperation position with the presence of a receiver mobile between 4 predetermined positions according to the first method.

The first method illustrated in FIGS. 1 to 3 is a method of identifying the position of a set of K objects in an environment, K being a natural number greater than or equal to 2, the method comprising the steps of:
a) providing a tool 1 configured to cooperate with each object of the set in a so-called cooperation position, tool 1 being equipped with a transmitter 10 of an Ultra Wide Band signal (UWB),
b) arranging at least one receiver 20, 21, 22, 23 in the environment to receive said signal for each of the K cooperation positions, the or each receiver 20, 21, 22, 23 being configured to deliver data representative of the corresponding cooperation position, said data forming a random variable, noted X,
c) acquiring at least M times the data delivered by the or each receiver 20, 21, 22, 23 for each of the K cooperation positions, where M is a natural number greater than a predetermined value,
d) calculating the expectation of X, noted E[X], for each of the K cooperation positions based on the M pieces of data acquired at step c),
e) arranging tool 1 in a cooperation position, called current position,
f) acquiring at least one piece of data, called current data, delivered by the or each receiver 20, 21, 22, 23 for the current position,
g) applying an identification criterion comprising E[X] based on the current data to identify the current position from among the K cooperation positions.

As non-limiting examples, the objects may be assembly points such as screws, rivets, welding spots. Tool 1 may then respectively be a screw gun, a riveting machine, a welding machine.

The K objects are not shown in FIGS. 1 to 3. The K objects are preferably fixed in the environment.

The environment may be an industrial and/or metallic environment. "Metallic environment" means an environment comprising an assembly of metal entities capable of excluding the presence of lines of sight of a radio wave.

"Ultra Wide Band" means a signal having:
an absolute bandwidth measured at −10 dB greater than 250 MHz, or even greater than 500 MHz if the United States definition of UWB is considered, or
a relative bandwidth measured at −10 dB greater than 20% of the central frequency.

UWB-type signals are particularly suited to an industrial and/or metallic environment since these signals are little confronted to multipath issues. The UWB-type signal is preferably a pulse signal.

According to an embodiment, step b) is executed with N fixed receivers in the environment, N being a natural number greater than or equal to 1. In the example illustrated in FIGS. 1 and 2, step b) is executed with four receivers 20, 21, 22, 23 fixed in the environment. The four receivers 20, 21, 22, 23 are arranged at step b) in the environment to receive the UWB signal for each of the K cooperation positions. For this purpose, each receiver 20, 21, 22, 23 is equipped with a receive antenna 3 configured to receive the UWB signal. Transmitter 10 equipping tool 1 comprises a transmit antenna 3'. Of course, it is possible to arrange a different number of receivers according to the desired reliability of the characteristic signature of the K cooperation positions, expressed at least by E[X]. A configuration with a single receiver may be envisaged for a particularly simple system. FIG. 2 illustrates the data representative of the k-th position $X_1, X_2, X_3, X_4$ respectively provided by the four receivers 20, 21, 22, 23. $X_{k,n}$ designates the data representative of the k-th cooperation position, k being in the range from 1 to K, and delivered by the n-th receiver 20, 21, 22, 23, n being in the range from 1 to N.

Figure 4A:
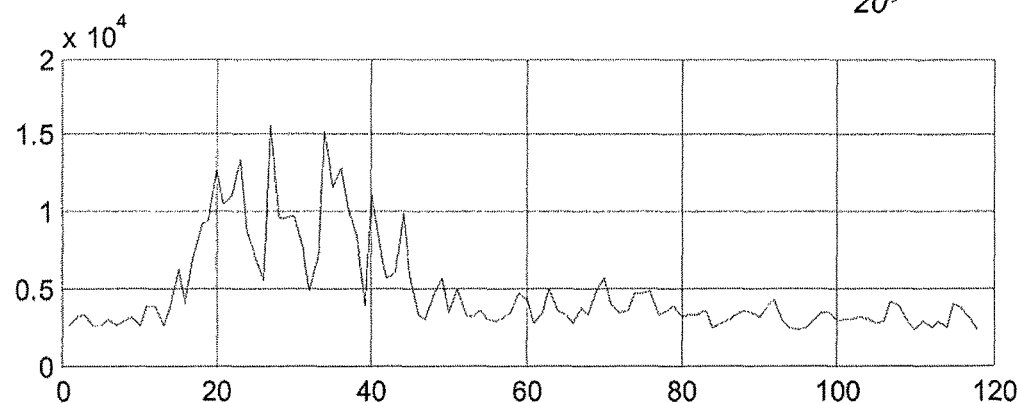
FIGS. 4a and 4b are simplified view of a pulse response of an amplitude propagation channel for two respective receivers, corresponding to a given cooperation position, the axes having arbitrary units.
Figure 4B:
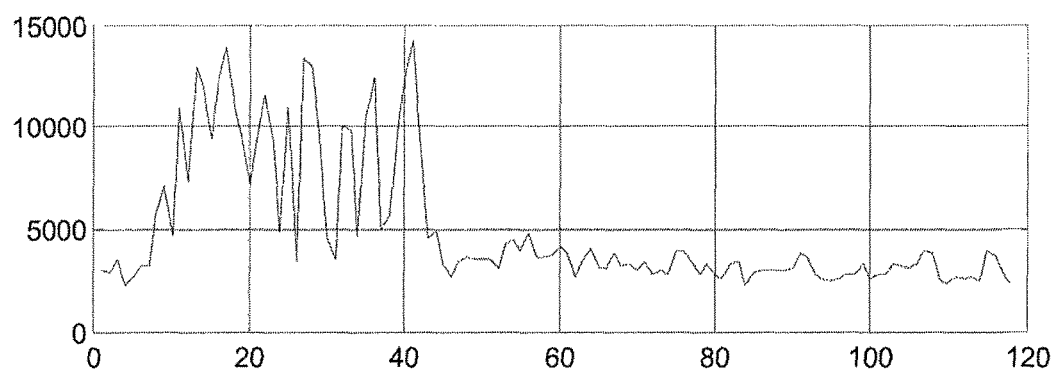

According to an embodiment, the UWB-type signal propagates between transmitter 10 and each receiver 20, 21, 22, 23 in a propagation channel. Data $X_{k,n}$ delivered at step b) by the n-th receiver 20, 21, 22, 23 comprises data representative of the distance between tool 1 in the corresponding cooperation position (the k-th one) and the corresponding receiver 20, 21, 22, 23 (the n-th one). The distance is extracted from the pulse response of the corresponding propagation channel. $X_{k,n}$ is scalar. As an illustration, FIGS. 4a and 4b show the amplitude pulse response respectively provided by two receivers for a given cooperation position. The pulse response may also be an energy response.

At step c), the value for M is preferably predetermined according to the background noise of the environment. Advantageously, M is in the range from 10 to 100.

According to an embodiment, step e) is executed by arranging tool 1 Q times in the K cooperation positions according to a predetermined order, where Q is a natural number greater than or equal to M, and steps c) and f) are simultaneous, the data acquired at step c) originating from the current data acquired at step f). The order of arrangement of tool 1 is predetermined in that an operator repeats Q times an ordered sequence of K cooperation positions with a low error probability, that is, lower than $10^{-2}$. The data acquired at step c) originating from the current data acquired at step f) are advantageously stored before executing calculation step d). As a result, identification step g) cannot be carried out simultaneously to step f) at least during the Q iterations.

According to an alternative embodiment, step c) is executed by arranging tool 1 a single time successively in the K cooperation positions, and step c) is prior to step e). As a result, identification step g) can be carried out simultaneously to step f).

According to an embodiment, step c) is executed by reproducibly arranging tool 1 in the K cooperation positions.

Step d) advantageously comprises a step d1) of calculating the standard deviation of X, noted $\sigma_X$, for each of the K cooperation positions from the M data acquired at step c), and the identification criterion applied at step g) further comprises $\sigma_X$.

The following notations are used:
$\mu_{k,n}$ for the expectation of $X_{k,n}$,
$\sigma_{k,n}$ for the standard deviation of $X_{k,n}$.

at the end of step d), an array, noted $\mathcal{M}_k \mathcal{M}^k$, forming a signature of the k-th cooperation position, is obtained.

$$\mathcal{M}_k \begin{pmatrix} \mu_{k,1} & \sigma_{k,1} \\ \vdots & \vdots \\ \mu_{k,N} & \sigma_{k,N} \end{pmatrix}$$

The identification criterion applied at step g) is advantageously the Mahalanobis distance between the current data and $\mu_{k,n}$ for the K cooperation positions.

Noting $r_n$ the current data acquired at step f) by the n-th receiver, n being in the range from 1 to N, the Mahalanobis distance can be written as:

$$d_k = \frac{1}{N}\sqrt{\sum_{n=1}^{N}\left(\frac{r_n - \mu_{k,n}}{\sigma_{k,n}}\right)^2}$$

The current position identified at the end of step g) corresponds to the k-th cooperation position which minimizes $d_k$. The identification of the current position enables to identify the position of the corresponding object.

According to an embodiment, step f) is executed by acquiring M' times the current data provided by each receiver 20, 21, 22, 23 for the current position. M' is a natural number, preferably smaller than M. The current data form a random variable, noted X'. Step f) comprises a step of calculating the expectation of X', noted E[X'], based on the M' pieces of acquired current data, for each receiver 20, 21, 22, 23. The identification criterion is applied to E[X'] at step g). Thus, noting $\mu'_n$ the expectation E[X'] calculated for the n-th receiver 20, 21, 22, 23, the Mahalanobis distance can be written as:

$$d_k = \frac{1}{N}\sqrt{\sum_{n=1}^{N}\left(\frac{\mu'_n - \mu_{k,n}}{\sigma_{k,n}}\right)^2}$$

The current position identified at the end of step g) corresponds to the k-th cooperation position which minimizes $d_k$. The identification of the current position enables to identify the position of the corresponding object.

According to an alternative embodiment, the identification criterion is applied to each of the M' current data at step g), and the current position is identified as the cooperation position mainly identified after step g).

According to an embodiment, data $X_{k,n}$ provided by the n-th receiver 20, 21, 22, 23 comprises all or part of the pulse response of the corresponding propagation channel, that is, the propagation channel between tool 1 in the corresponding cooperation position (the k-th one) and the corresponding receiver 20, 21, 22, 23 (the n-th one). $X_{k,n}$ is vectorial, and comprises L values, L being a natural number, preferably in the range from 50 to 200. The current data provided by the n-th receiver 20, 21, 22, 23 are noted $X'_n$ and also comprise L values.

According to an embodiment, the pulse response has complex values. The identification criterion applied at step g) is selected from the group comprising the scalar product, and the vectorial product between the current data and the expectation of $X_{k,n}$ noted $\mu_{k,n}$. $\overline{X'_n}$ is the conjugate of $X'_n$.

The scalar product, noted SCAL, for each receiver 20, 21, 22, 23, and for the k-th cooperation position, can be written as:

$$SCAL(k, n) = \sum_{l=1}^{L} \mu_{k,n}(l) * \overline{X'_n(l)}$$

$$SCAL(k, n) = \sum_{l=1}^{L} (\Re[\mu_{k,n}(l)] * \Re[X'_n(l)] + \Im[\mu_{k,n}(l)] * \Im[X'_n(l)])$$

where:
$\Re$ is the real part,
$\Im$ is the imaginary part.

The current position identified at the end of step g) corresponds to the k-th cooperation position which maximizes SCAL(k,n) for each receiver 20, 21, 22, 23 or for a majority of receivers 20, 21, 22, 23. The identification of the current position enables to identify the position of the corresponding object.

The vectorial product, noted VECT, for each receiver 20, 21, 22, 23, and for the k-th cooperation position, can be written as:

$$VECT(k, n) = \sum_{l=1}^{L} (\Re[\mu_{k,n}(l)] * \Im[X'_n(l)] - \Im[\mu_{k,n}(l)] * \Re[X'_n(l)])$$

The current position identified at the end of step g) corresponds to the k-th cooperation position which minimizes VECT(k,n) for each receiver 20, 21, 22, 23 or for a majority of receivers 20, 21, 22, 23. The identification of the current position enables to identify the position of the corresponding object.

According to an embodiment, the pulse response has real values. The identification criterion applied at step g) is the coefficient of intercorrelation between the current data provided by the n-th receiver 20, 21, 22, 23, noted $X'_n$ and the expectation of $X_{k,n}$ noted $\mu_{k,n}$.

The intercorrelation coefficient, noted IC, for each receiver 20, 21, 22, 23, and for the k-th cooperation position, can be written as:

$$IC(k, n) = \sum_{l=1}^{L} \mu_{k,n}(l) * X'_n(l)$$

The current position identified at the end of step g) corresponds to the k-th cooperation position which maximizes IC(k,n) for each receiver 20, 21, 22, 23 or for a majority of receivers 20, 21, 22, 23. The identification of the current position enables to identify the position of the corresponding object.

According to an embodiment illustrated in FIG. 3, the method differs in that step b) is executed with a single receiver 20 mobile in the environment between N predetermined positions according to the K cooperation positions, N being a natural number greater than or equal to 2. In the example illustrated in FIG. 3, receiver 20 is mobile between 4 predetermined positions. The arrow in dotted lines indicates the displacement of receiver 20.

Figure 5:
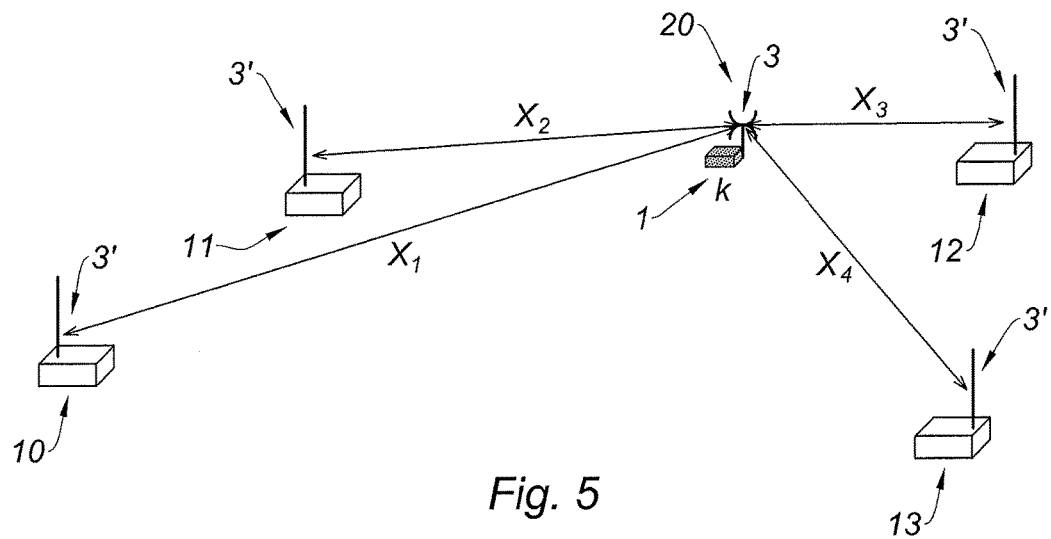
FIG. 5 is a simplified view of a tool arranged in a k-th given cooperation position according to a second method according to the invention, and illustrating the transmission of a UWB-type signal by 4 fixed emitters and its reception by the tool.

The second method illustrated in FIG. 5 differs from the first method in that tool 1 is equipped with a receiver 20 provided with an antenna 3 for receiving a UWB-type signal and in that step b) comprises arranging at least one transmitter 10, 11, 12, 13 in the environment to transmit said signal for each of the K cooperation positions. The or each transmitter 10, 11, 12, 13 is provided with a transmit antenna 3'.

In the case of the first and second methods, the extraction of the distance from the data provided at step b) is advantageously obtained by a ranging technique called time difference of arrival or TDOA technique.

In the first method, the data acquired at step c) and at step f) by receivers 20, 21, 22, 23 of the environment should be gathered to be processed, which may be complex to implement. In return, the refreshment rate, and thus the number of acquired measurements, is increased. The system reactivity and/or the measurement accuracy (for example, by averaging a plurality of measurements) can thus be increased.

In the second method, the data acquired at step c) and at step f) are centralized by receiver 20 of tool 1. The data can thus be directly processed, with no retransmission of the acquired measurements to a central node. The refreshment rate is of course not as good in this case.

Figure 6:
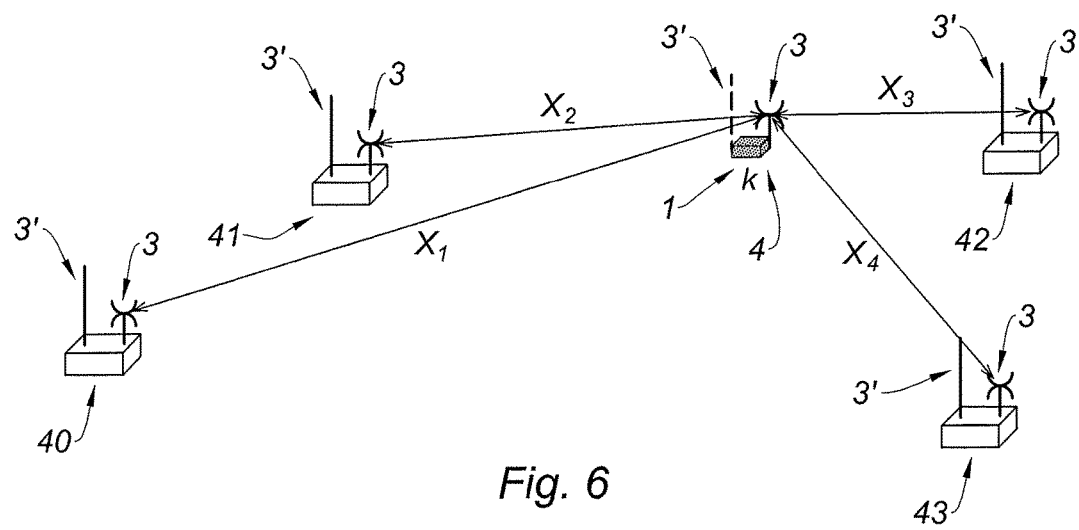
FIG. 6 is a simplified view of a tool arranged in a k-th given cooperation position according to a third method according to the invention, and illustrating the transmission-reception of a UWB-type signal by 4 fixed transceivers and by the tool.

The third method illustrated in FIG. 6 differs from the first method in that tool 1 is equipped with a transceiver 4 of a UWB-type signal provided with a receive antenna 3 and with a transmit antenna 3', and in that step b) comprises arranging at least one transceiver 40, 41, 42, 43 in the environment to transmit and receive said signal for each of the K cooperation positions. The extraction of the distance from the data provided at step b) is advantageously achieved with a ranging technique called time of arrival or TOA technique associated with a so-called TWR protocol (Two-Way Ranging) which enables to estimate the time necessary to travel from the transceiver of the tool to each transceiver of the environment and back, from which corresponding distance can be obtained.

As a non-limiting example, when tool 1 is a screw gun and the K objects are assembly points such as screws, in terms of performance, it is advantageous to perform as many measurements per screwing time as possible due to an improvement of the reactivity and/or of the accuracy (by averaging). The method with the higher performance, that is, which enables to perform the greatest number of measurements per screwing time, is the first method, followed by the second method, and then followed by the third method, provided to have adapted data repatriation means, such as a conventional narrow-band radio link (for example, of Bluetooth or Wifi type), currently used on a number of existing UWB equipment.

The conventional UWB positioning method (by trilateration) avoids the TDOA technique since this requires a procedure of fine synchronization between the fixed nodes, which is very cumbersome. With the technique of characteristic cooperation position signature, such a fine synchronization procedure is not necessary: a rough synchronization for each fixed node, independently from the others, only based on a realignment of the receive window based on the time of arrival of the previous UWB frame is sufficient and simple to implement.

The invention claimed is:
1. A method of identifying a position of a tool among a plurality of cooperation positions in an environment provided with at least one receiver, the method comprising the successive steps of:

a) providing a transmitter of a signal of Ultra Wide Band type and configured to transmit Ultra Wide Band pulse signals and providing a plurality of assembly points in the environment, each assembly point corresponding to a cooperation position of the plurality of cooperation positions;

b) moving the transmitter to the plurality of assembly points so as to move the transmitter to the plurality of cooperation positions and transmitting Ultra Wide Band pulse signals for each of the plurality of cooperation positions;

c) for each of the plurality of cooperation positions, receiving said Ultra Wide Band pulse signals from the transmitter by each receiver of the at least one receiver, each Ultra Wide Band pulse signal having a propagation channel and each receiver delivering a data representative of each propagation channel, said data being in vectorial form, noted X, and for each of the plurality of cooperation positions of the transmitter and for each receiver, acquiring the data a plurality of times;

d) calculating expectation of X, noted E[X] from the plurality of acquisition of the data for each cooperation positions and for each receiver;

e) making a tool comprising the transmitter of a signal of Ultra Wide Band type to cooperate with one of the plurality of assembly points and transmitting Ultra Wide Band pulse signals during cooperation;

f) receiving the Ultra Wide Band pulse signals from the tool by the at least one receiver, the at least one receiver providing a current data representative of the location of the tool; and g) applying an identification criterion comprising expectation of X E[X] based on the current data to identify the current position from among the plurality of assembly points;

wherein step e) is executed by arranging the tool Q times in the K cooperation positions according to a predetermined order, where Q is a natural number greater than or equal to M, and wherein steps c) and f) are simultaneous, the data acquired at step c) originating from the current data acquired at step f);

wherein step c) is executed by arranging the tool a single time successively in the K cooperation positions, and wherein step c) is prior to step e);

wherein step f) is executed by acquiring M' times the current data, where M' is a natural number; and wherein the current data form a random variable, noted X', wherein step f) comprises a step of calculating the expectation of X', noted E[X'], based on the M' acquired pieces of current data, and wherein the identification criterion is applied from E[X'] at step g).

2. The method according to claim 1, wherein the signal propagates in a propagation channel, and wherein the data delivered at step b) comprise all or part of the pulse response of the corresponding propagation channel.

3. The method according to claim 2, wherein the pulse response has complex values, and wherein the identification criterion applied at step g) is selected from the group comprising a scalar product and a vectorial product, between the current data and E[X].

4. The method according to claim 2, wherein the pulse response has real values, and wherein the identification criterion applied at step g) is the coefficient of intercorrelation between the current data and E[X].

5. The method according to claim 1, wherein step b) is executed with N fixed receivers in the environment, N being a natural number greater than or equal to 1.

6. The method according to claim 1, wherein step b) is executed with a single receiver mobile in the environment between N predetermined positions according to the K cooperation positions, N being a natural number greater than or equal to 2.

7. The method according to claim 1, wherein the identification criterion is applied from each of the M' current data at step g), and wherein the current position is identified as the cooperation position predominantly identified after step g).

8. The method according to claim 1, wherein the K assembly points are fixed in the environment.

9. The method according to claim 1, wherein step c) is executed by reproducibly arranging the tool in the K cooperation positions.

* * * * *